(12) United States Patent
Shen et al.

(10) Patent No.: US 7,055,280 B2
(45) Date of Patent: Jun. 6, 2006

(54) FISHING BAIT DELIVERY SYSTEM

(76) Inventors: Jack Shen, 5564 Santa Cruz Dr., Hanover Park, IL (US) 60103; Jack Shen, Jr., 5564 Santa Cruz Dr., Hanover Park, IL (US) 60103

( * ) Notice: Subject to any disclaimer, the term of this patent is extended or adjusted under 35 U.S.C. 154(b) by 0 days.

(21) Appl. No.: 10/767,493

(22) Filed: Jan. 29, 2004

(65) Prior Publication Data

US 2005/0166443 A1 Aug. 4, 2005

(51) Int. Cl.
*A01K 89/00* (2006.01)

(52) U.S. Cl. ...................................... 43/26.1
(58) Field of Classification Search ............... 43/26.1, 43/26.2, 43.12
See application file for complete search history.

(56) References Cited

U.S. PATENT DOCUMENTS

| | | | | |
|---|---|---|---|---|
| 3,798,825 | A | * 3/1974 | Popeil | 43/44.9 |
| 4,757,633 | A | * 7/1988 | Van Cleve | 43/26.1 |
| 5,154,016 | A | * 10/1992 | Fedora et al. | 43/26.1 |
| 5,165,193 | A | * 11/1992 | Dankwardt | 43/26.1 |
| 5,806,232 | A | * 9/1998 | James | 43/26.1 |
| 6,041,537 | A | * 3/2000 | Sullivan | 43/26.1 |
| 6,122,852 | A | * 9/2000 | Mechling, IV | 43/4 |
| 6,389,732 | B1 | * 5/2002 | Daniel | 43/4.5 |
| 6,497,066 | B1 | 12/2002 | Harrison | |
| 6,520,105 | B1 | * 2/2003 | Koda et al. | 114/255 |
| 6,822,927 | B1 | * 11/2004 | Holm | 367/107 |
| 2004/0083642 | A1 | * 5/2004 | Huikari | 43/26.1 |

OTHER PUBLICATIONS

Printout of web site showing Humminbird Smartcast fishfinder product, found at the URL: http://www.humminbird.com/hb_Products.asp?ID=336. Publication date unknown. (2 pages).

* cited by examiner

*Primary Examiner*—Teri Pham Luu
*Assistant Examiner*—Kimberly S. Smith
(74) *Attorney, Agent, or Firm*—Law office of Marc D. Machtinger, Ltd.

(57) ABSTRACT

A fishing bait delivery system is disclosed. The system has a remotely controlled bait delivery vehicle, a fishing pole assembly, and a remote control for controlling bait delivery vehicle. The bait delivery vehicle has a fishing bait holder that holds a baited end of a fishing line until the baited end is released at a desired location. The fishing bait is secured to the fishing pole assembly via the fishing line. The fishing pole assembly is made up of a conventional fishing rod and reel. The fishing bait can be natural, living or deceased, or artificial. For live bait, the bait delivery vehicle can include a live bait well. In various embodiments the release of fishing bait may be automated. The system can use fish finding technology, wherein the bait delivery vehicle includes a fish finding sensor which transmits data to a fish finder viewer.

14 Claims, 3 Drawing Sheets

FISHING BAIT DELIVERY SYSTEM

BACKGROUND OF THE INVENTION

1. Field of the Invention

The present invention relates to fishing, and more specifically to a system and method for delivering a fishing bait to a desired location.

2. Description of the Related Art

In the sport of fishing, the conventional way to get a fishing bait to a particular location is to cast the bait. Casting generally involves a complex set of steps using arm and wrist motion to whip the tip of a fishing pole in a desired direction coupled with complex hand motions that control the fishing line as it unwinds from the reel. The length of the cast, that is, the distance the bait travels, is dependent on the force of the cast (often a function of the fisher's arm and wrist strength) and other external factors, such as the weight of the bait and winds. For even the most experienced fisher, casting is as much an art as it is a science.

For an inexperienced fisher, casting can be a dangerous endeavor. If the complex steps are not performed in the correct sequence and in the right directions, the bait, complete with hook, may fly off in an unintended direction. This poses a risk to the fisher, his or her fishing companions, and even innocent bystanders. Many instances occur every year where medical treatment is required to remove a fishing hook from someone accidentally snared by a cast gone wrong.

Numerous attempts have been made to improve the consistency, accuracy, and distance of the fishing cast maneuver. One such attempt is described in U.S. Pat. No. 6,497,006, issued to Harrison. Harrison discloses an automatic fishing line casting system that includes positioning a projectile in the bore of a barrel. The projectile is coupled to the fishing line. A propellant is used to propel the projectile and the fishing line is pulled along with the projectile. While the Harrison casting system may result in a cast that is longer than a cast achievable by hand, the Harrison casting system is still susceptible to external factors, such as wind, and does not assure that the cast will put the fishing bait at the desired location.

Additionally, the use of fish finding technology is well known in the sport of fishing. Typically a fish finding sensor is located in close proximity to the fisher, usually mounted to the fishing boat or dock from which the fisher is fishing. Fish finders also have a display, either hard wired or wireless to display what is detected by the fish finding sensor. While a conventional fish finder will tell a user where fish are located relative to the sensor, it will not tell a user where fish are relative to where the fisher has cast the bait.

An attempt to address this problem is offered by a system under the name Humminbird SMARTCAST. In this system a fish finding sensor is secured to a fishing line near the bait. When the bait is cast, the sensor and the bait stay in relative close proximity, giving the fisher an indication of the presence of fish near the bait. The sensor wirelessly transmits data to a display that can be worn on the fisher's wrist. Unfortunately, the fisher does not know of the presence of fish until after the bait has been cast. Furthermore, the casting distance is limited to the manual casting abilities of the fisher.

Thus, it would be advantageous to provide a bait delivery system that eliminates the complexity, uncertainty, and hazards of casting and can deliver a fishing bait to a desired location. Furthermore, it would be advantageous to provide a system that uses fish finding technology to determine a desired location and accurately delivers a fishing bait to that location.

SUMMARY

In view of the deficiencies described above, it is an object of the present invention to provide a system that can deliver a fishing bait to a desired location.

It is a further object of the present invention to provide a fishing bait delivery system that eliminates the hazardous and complex casting maneuver.

It is a further object of the present invention to provide a fishing bait delivery system that can deliver a fishing bait to a location that is further away from the fisher than the fisher could achieve through casting.

The system of the present invention has three main components: a remotely controlled bait delivery vehicle, a fishing pole assembly, and a remote control for controlling the remotely controlled bait delivery vehicle. The remotely controlled bait delivery vehicle has a fishing bait holder that holds a fishing bait or bated end portion of a fishing line until the bait is released at a desired location. The fishing bait is secured to the fishing pole assembly via the fishing line. The fishing pole assembly is made up of a conventional fishing rod and reel.

The bait delivery vehicle has a propulsion system, which is used to propel and maneuver the vehicle across water. A remote control receiver receives signals from a remote control module and converts the received signals into commands for the propulsion system. The remote control module has controls for the movement of the vehicle, such as forward, reverse, left and right direction of the bait delivery vehicle. The remote control module can also control the release of the bait. The remote control module may be mounted to the fishing rod using mounting rings.

The fishing bait can be natural, either living or deceased, or artificial. For living natural fishing bait, the bait delivery vehicle can include a live well. When the bait delivery vehicle reaches a desired location, the bait holder is opened, releasing the fishing line. Tension on the fishing line causes the fishing bait to slide from the live well into the water as the bait delivery vehicle is maneuvered away. In various embodiments the release of fishing bait may be automated.

The system can make use of fish finding technology, wherein a fish finding sensor is included in the bait delivery vehicle. The fish finding sensor transmits data to a fish finder viewer. The fish finder viewer is used to display data received from the fish finding sensor. The fish finder viewer may be located in any number of locations.

The system enhances the abilities of a fisher in several ways. For example, the bait can be released much further away from the fisher than would be possible via manual casting of the line, as much as ten times the typical casting distance or greater. Furthermore, the system enables the fisher to locate the target fish and release the bait precisely in the vicinity of the desired fish. A vast area can be searched for fish before precision-releasing the bait without the need to cast and recast the line multiple times.

Other features and advantages of the invention will be apparent from the following detailed description taken in conjunction with the following figures, wherein like reference numerals represent like features.

BRIEF DESCRIPTION OF THE DRAWINGS

FIG. 6A shows a bait holder in a closed position accordance with the present invention in.

FIG. 6B shows a bait holder in an open position accordance with the present invention in.

DETAILED DESCRIPTION OF THE INVENTION

Figure 1:
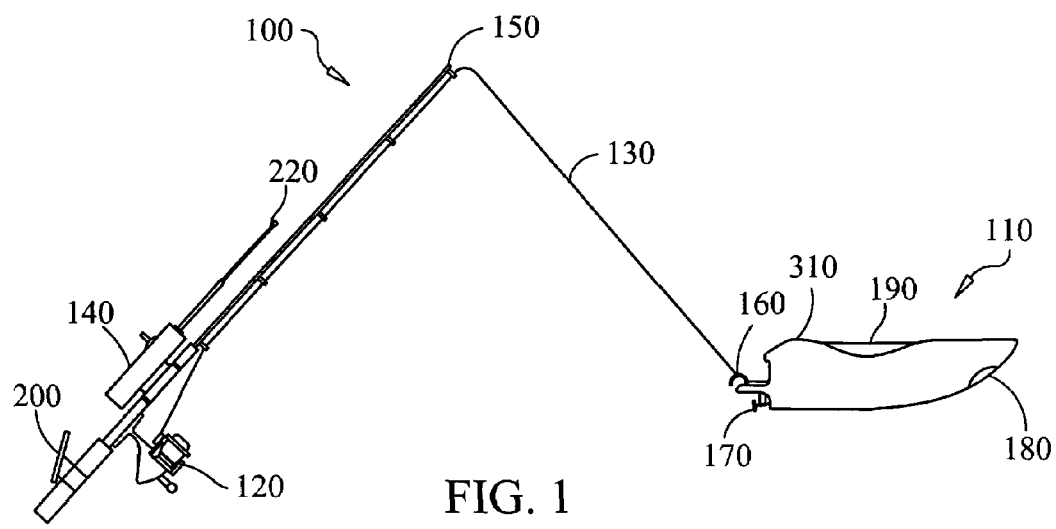
FIG. 1 shows a fishing bait delivery system according to the present invention.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

The present invention is a fishing bait delivery system. The present invention eliminates the complexity and hazards of the casting maneuver by directly delivering a fishing bait to a desired location. Furthermore the present invention allows a fishing bait to be delivered to a location that is further away from a fisher than the fisher could accomplish through casting.

The present invention has three main components: a remotely controlled bait delivery vehicle 110, a fishing pole assembly 100, and a remote control 140 for controlling the remotely controlled bait delivery vehicle 110. FIG. 1 shows a fishing bait delivery system according to the present invention. The remotely controlled bait delivery vehicle 110 has a fishing bait holder 160, which selectively holds and releases a baited end portion of a fishing line 130. The fishing bait 350 is secured to the fishing pole assembly 100 via the fishing line 130. The fishing pole assembly 100 is made up of a conventional fishing rod 150 and reel 120. The remote control for controlling the remotely controlled bait delivery vehicle 110 is shown as remote control module 140. The remote control technology for controlling a vehicle of this type is well known.

Figure 4:
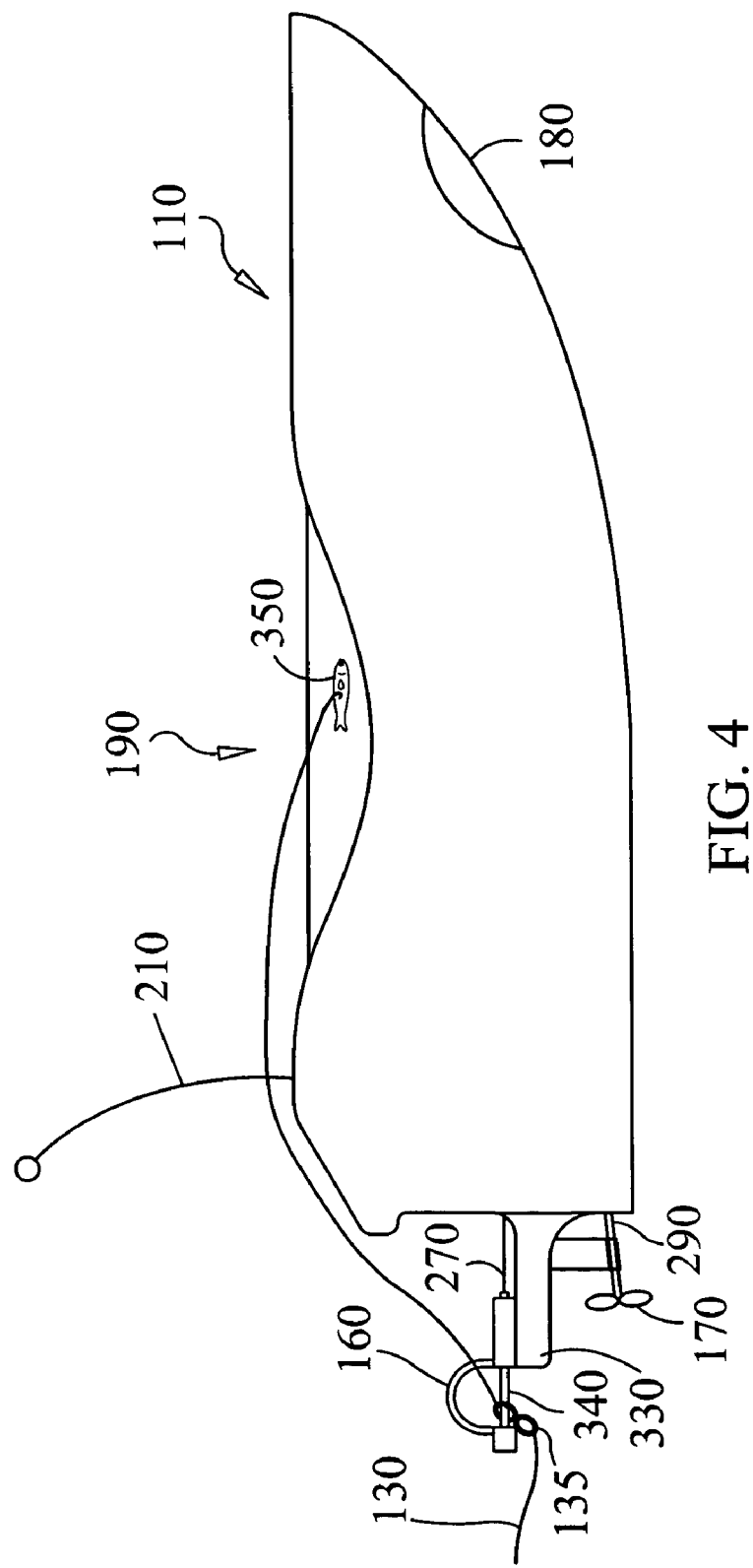
FIG. 4 shows a side view of a bait delivery vehicle in accordance with the present invention.
Figure 5:
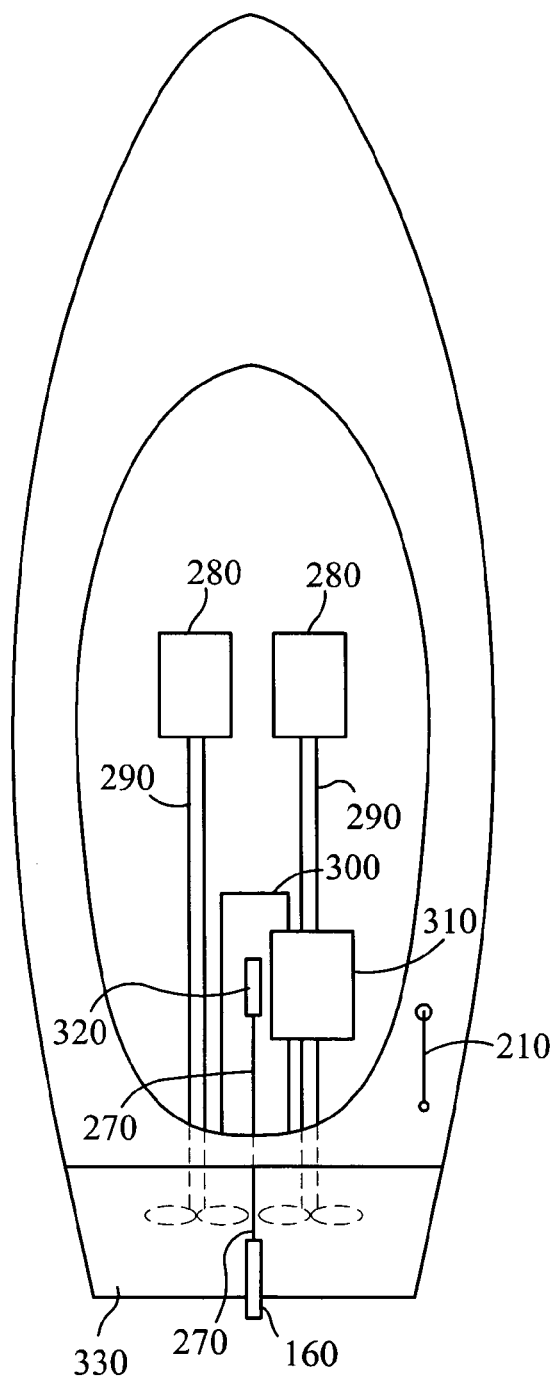
FIG. 5 shows a top view of a bait delivery vehicle in accordance with the present invention with portions cutaway so as to see inner workings of the vehicle.

As shown in FIGS. 1, 4, 5, 6A, and 6B, bait delivery vehicle 110 is generally shaped as a mono hulled boat. A boat shape allows bait delivery vehicle 110 to be efficiently maneuvered across water. Other vehicle shapes may also be used, including, but not limited to, a multi hulled boat shape, a sub-surface marine vehicle, and a flying vehicle. Bait delivery vehicle 110 has a propulsion system, which is used to propel and maneuver the vehicle 110. A sample propulsion system is shown in FIG. 5, where a power source, shown as battery 300, supplies motors 280 with power. Motors 280 turn propeller shafts 290, which are connected to propellers 170. The vehicle 110 is maneuvered by controlling the propellers 170. Other propulsion systems and maneuvering mechanisms may also be used. Remote control receiver 310 receives signals from remote control module 140, discussed below, aided by antenna 210. Remote control receiver 310 converts the received signals into commands for the propulsion system.

Figure 6A:
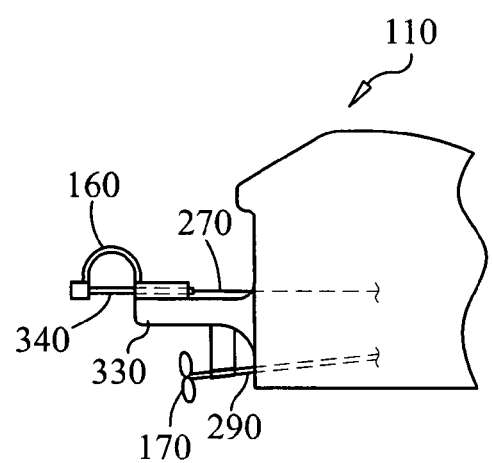
Figure 6B:
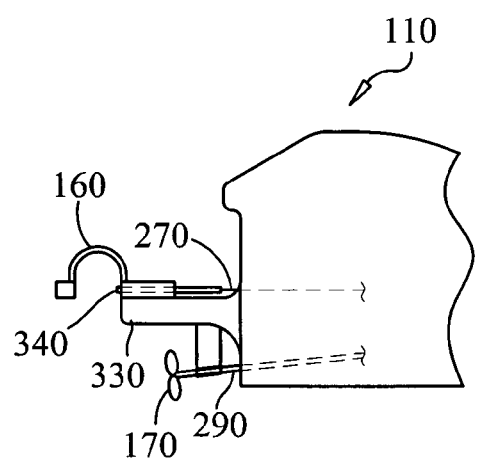

As discussed above, the vehicle 110 has a fishing bait holder 160. The bait holder 160 is not restricted to only holding the bait 350. Bait holder 160 may hold any part of the baited end portion of the fishing line 130, which may include, but is not limited to, a swivel 135, a leader (not shown), a sinker (not shown), a bobber (not shown), and the fishing line 130 itself. A sample fishing bait holder 160 is shown in FIGS. 4, 6A, and 6B. As shown, bait holder 160 is mounted on bait deck 330. Bait holder 160 is shown as an inverted "U". The open end of the "U" is selectively closed by pin 340 which is held in place by retaining means for holding pin 340. Pin 340 is connected to a release mechanism servo 320 via a release mechanism cable 270. Release mechanism servo 320 is activated by remote control receiver 310, when commanded by a signal from remote control module 140, discussed below. Other bait holder shapes and release mechanisms may also be used.

In use, the baited end portion of the fishing line 130 is secured by the bait holder 160. When the bait delivery vehicle 110 reaches a desired location, the bait holder 160 is commanded to release the baited end portion of the fishing line 130, and thus release the bait 350, allowing the bait 350 descend into the water as the bait delivery vehicle 110 is maneuvered away.

The fishing bait 350 can be natural, either living or deceased, or artificial. For living natural fishing bait 350, the bait delivery vehicle can include a live well 190. In these embodiments, the fishing bait 350 is kept in the live well 190. Baited end portion of the fishing line 130 is routed through the bait holder 160. When the bait delivery vehicle 110 reaches a desired location, the bait holder 160 is opened, releasing baited end portion of the fishing line 130. Tension on fishing line 130 causes the fishing bait 350 to slide from the live well 190 into the water as the bait delivery vehicle 110 is maneuvered away. In other embodiments fishing bait 350 can rest on bait deck 340.

Figure 2:
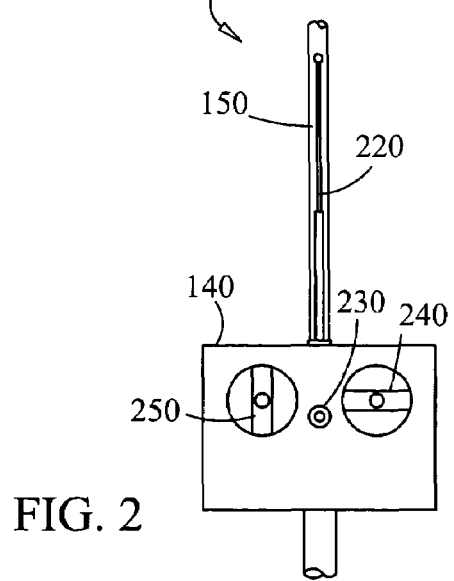
FIG. 2 shows a top view of a remote control module according to the present invention.

The remote control module 140 controls the movement, such as forward, reverse, left and right direction of the bait delivery vehicle 110. As shown in FIG. 2, remote control module 140 has a Forward/Reverse lever 250 for controlling the fore/aft direction of the bait delivery vehicle 110. Left/Right lever 240 is used to turn the bait delivery vehicle 110 left or right. Antenna 220 is used to transmit control signals to bait delivery vehicle 110. Also shown in FIG. 2 is bait release button 230, which is used to command the release of the fishing bait 350. Besides using left/right lever 240 and forward/reverse lever 250, other types of controls may be used, including, but not limited to, a single omni directional lever or joystick, a track ball, or foot pedal controls.

Figure 3:
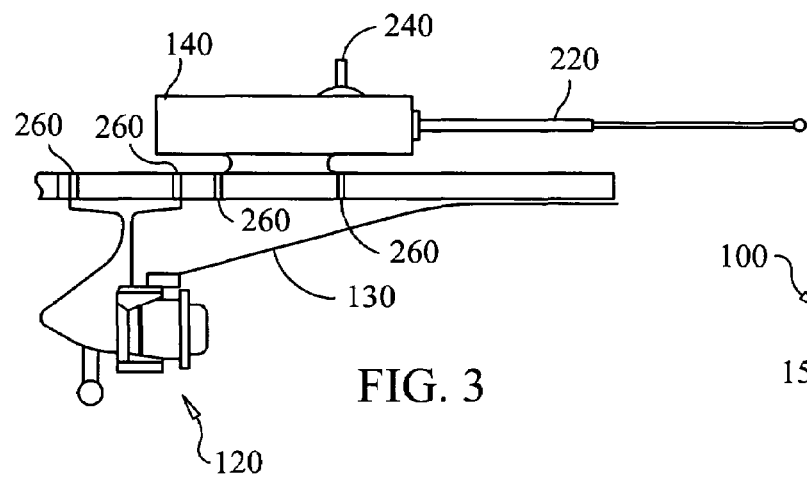
FIG. 3 shows a side view of a remote control module according to the present invention.

In FIGS. 1–3, remote control module 140 is shown mounted to fishing rod 150, although this is not a requirement for the present invention. To mount remote control module 140 to fishing rod 150, mounting rings 260 may be used. Mounting rings 260 are commonly used to mount fishing reels, such as reel 120, to a fishing rod 150.

In various embodiments, the present invention can make use of fish finding technology. FIGS. 1 and 4 show a fish finding sensor 180 included in the bait delivery vehicle 110. Fish finding sensor 180 can be internal or external to the vehicle 110, based on the needs of the particular sensor technology being used. Fish finding sensor 180 transmits data to a fish finder viewer 200. Fish finder viewer 200 is used to display data received from the fish finding sensor 180. Typically the data received from fish finding sensor 180 and displayed on fish finder viewer 200 includes information regarding water depth, and depth and location of fish relative to the sensor 180. Other data may include information regarding the size of fish detected by the sensor 180.

Fish finder viewer 200 may be located in any number of locations. FIG. 1 shows find finder viewer 200 mounted to fishing rod 150 as part of fishing pole assembly 100. In the embodiment shown in FIG. 1, fish finder viewer 200 can be mounted using mounting rings 260 or other conventional means. Alternatively, fish finder viewer 200 can be part of a separate unit, not shown. This separate unit could be free standing, wearable, such as on the fisher's wrist, or mountable to another object, such as a boat.

In various embodiments the release of baited end portion of the fishing line 130 may be automated. In these embodiments the system would have a computing device, not shown, capable of processing information and commanding appropriate action. The computing device could be in the form of a computer chip, a prom, a computer, or other device that can perform similar functions. For example, if fish finder sensor 180 detects a fish of a predetermined size, the system could command the release of the baited end portion of the fishing line 130 in close proximity to the fish. Another example of release automation includes adjusting the depth to which fishing bait 350 descends to. This may be accomplished by adjusting the amount of fishing line between the fishing bait 350 and a bobber (not shown), selectively adding or removing weight to a sinker (not shown), or by any other know means for adjusting fishing bait 350 depth.

While specific embodiments have been illustrated and described, numerous modifications come to mind without significantly departing from the spirit of the invention and the scope of protection is limited by the scope of the accompanying claims.

What is claimed is:

1. A fishing bait delivery system comprising:
    a remotely controlled bait delivery vehicle having means for holding and selectively releasing a baited end portion of a fishing line,
    said baited end portion of a fishing line having at least a fishing bait,
    said fishing bait being connected to a fishing pole assembly via a fishing line, and
    means for controlling said remotely controlled bait delivery vehicle,
    wherein said means for holding and selectively releasing a fishing bait comprises a u-shaped bait holder, having open and closed ends, said open end of said u-shaped bait holder having retaining means for holding a pin, wherein said pin slides to open and close said open end of said u-shaped bait holder, said pin being connected to a release mechanism servo, and said release mechanism servo being remotely activated.

2. The fishing bait delivery system according to claim 1, wherein said remotely controlled bait delivery vehicle is a remotely controlled boat.

3. The fishing bait delivery system according to claim 1, wherein said means for controlling said remotely controlled bait delivery vehicle comprises a bait delivery vehicle remote control module having means for controlling at least a forward motion and a turning direction of said bait delivery vehicle.

4. The fishing bait delivery system according to claim 1, wherein said means for controlling said remotely controlled bait delivery vehicle comprises controlling a forward, a reverse, a left and a right direction of said bait delivery vehicle.

5. The fishing bait delivery system according to claim 3, wherein said bait delivery remote control module further comprises means for commanding the release of said fishing bait.

6. The fishing bait delivery system according to claim 5, wherein said means for commanding the release of said fishing bait comprises a bait release button.

7. The fishing bait delivery system according to claim 3, wherein said bait delivery vehicle remote control module is mounted on said fishing pole assembly.

8. The fishing bait delivery system according to claim 1, wherein said remotely controlled bait delivery vehicle further comprises a fish finding sensor, and said system further comprises a fish finder viewer.

9. The fishing bait delivery system according to claim 8, wherein said fish finder viewer is mounted on said fishing pole assembly.

10. The fishing bait delivery system according to claim 1, wherein said remotely controlled bait delivery vehicle further comprises a live bait well.

11. The fishing bait delivery system according to claim 1, wherein said remotely controlled bait delivery vehicle has a propulsion system comprising: at least one electric motor, a propeller shaft connected to said electric motor, a propeller connected to said propeller shaft, and a power source electrically connected to said electric motor.

12. A fishing bait delivery system comprising:
    a remotely controlled bait delivery vehicle having means for holding and selectively releasing a baited end portion of a fishing line, wherein said means for holding and selectively releasing a fishing bait comprises a u-shaped bait holder, having open and closed ends, said open end of said u-shaped bait holder having retaining means for holding a pin, wherein said pin slides to open and close said open end of said u-shaped bait holder, said pin being connected to a release mechanism servo, and said release mechanism servo being remotely activated,
    said baited end portion of a fishing line having at least a fishing bait,
    said fishing bait being connected to a fishing pole assembly via a fishing line, and
    means for controlling said remotely controlled bait delivery vehicle,
    wherein said remotely controlled bait delivery vehicle further comprises a fish finding sensor, and said system further comprises a fish finder viewer, and
    wherein said system further comprises: computing device implemented means for determining the size of fish detected by said fish finding sensor, and computing device implemented means for commanding the release of said fishing bait automatically when a fish of a predetermined size is detected.

13. A fishing bait delivery system comprising:
    a remotely controlled bait delivery vehicle having means for holding and selectively releasing a baited end portion of a fishing line, wherein said means for holding and selectively releasing a fishing bait comprises a u-shaped bait holder, having open and closed ends, said open end of said u-shaped bait holder having retaining means for holding a pin, wherein said pin slides to open and close said open end of said u-shaped bait holder, said pin being connected to a release mechanism servo, and said release mechanism servo being remotely activated,
    said baited end portion of a fishing line having at least a fishing bait, said fishing bait being connected to a fishing pole assembly via a fishing line, and means for controlling said remotely controlled bait delivery vehicle, wherein said remotely controlled bait delivery vehicle further comprises a fish finding sensor, and said system further comprises a fish finder viewer, and wherein said system further comprises: computing device implemented means for determining the depth of fish detected by said fish finding sensor, and means for automatically adjusting the depth said bait descends to when released.

14. The fishing bait delivery system according to claim 13, wherein said means for adjusting the depth said bait descends to comprises automatically adjusting the amount of fishing line between said bait and a bobber.

* * * * *